United States Patent [19]
Nickerson

[11] 3,721,887
[45] March 20, 1973

[54] BATTERY PROTECTION CIRCUIT
[75] Inventor: Charles Nickerson, Poulsbo, Wash.
[73] Assignee: American Telephone and Telegraph Company, New York, N.Y.
[22] Filed: Nov. 24, 1971
[21] Appl. No.: 201,656

[52] U.S. Cl..............................320/13, 307/66
[51] Int. Cl................................H02j 9/00
[58] Field of Search............320/13, 25, 11, 56, 14, 8; 307/66

[56] References Cited

UNITED STATES PATENTS

| | | | |
|---|---|---|---|
| 3,603,973 | 9/1971 | Hough | 307/66 X |
| 3,308,306 | 3/1967 | Bagno | 307/66 |
| 3,596,106 | 7/1971 | Raddi | 307/66 |
| 3,573,483 | 4/1971 | White | 307/66 |

Primary Examiner—J. D. Miller
Assistant Examiner—Robert J. Hickey
Attorney—N. S. Ewing et al.

[57] ABSTRACT

A protection circuit for an AC powered unregulated power supply having a rechargeable battery means comprising nickel-cadmium cells comprises a two-state circuit which is energized by the presence of AC power supplied to the unregulated power supply. The protection circuit is arranged to disconnect the load from the power supply in the event that AC power fails and the terminal voltage of the battery means falls below a predetermined minimum value. Furthermore, the load will not be picked up until AC power is restored.

2 Claims, 1 Drawing Figure

3,721,887
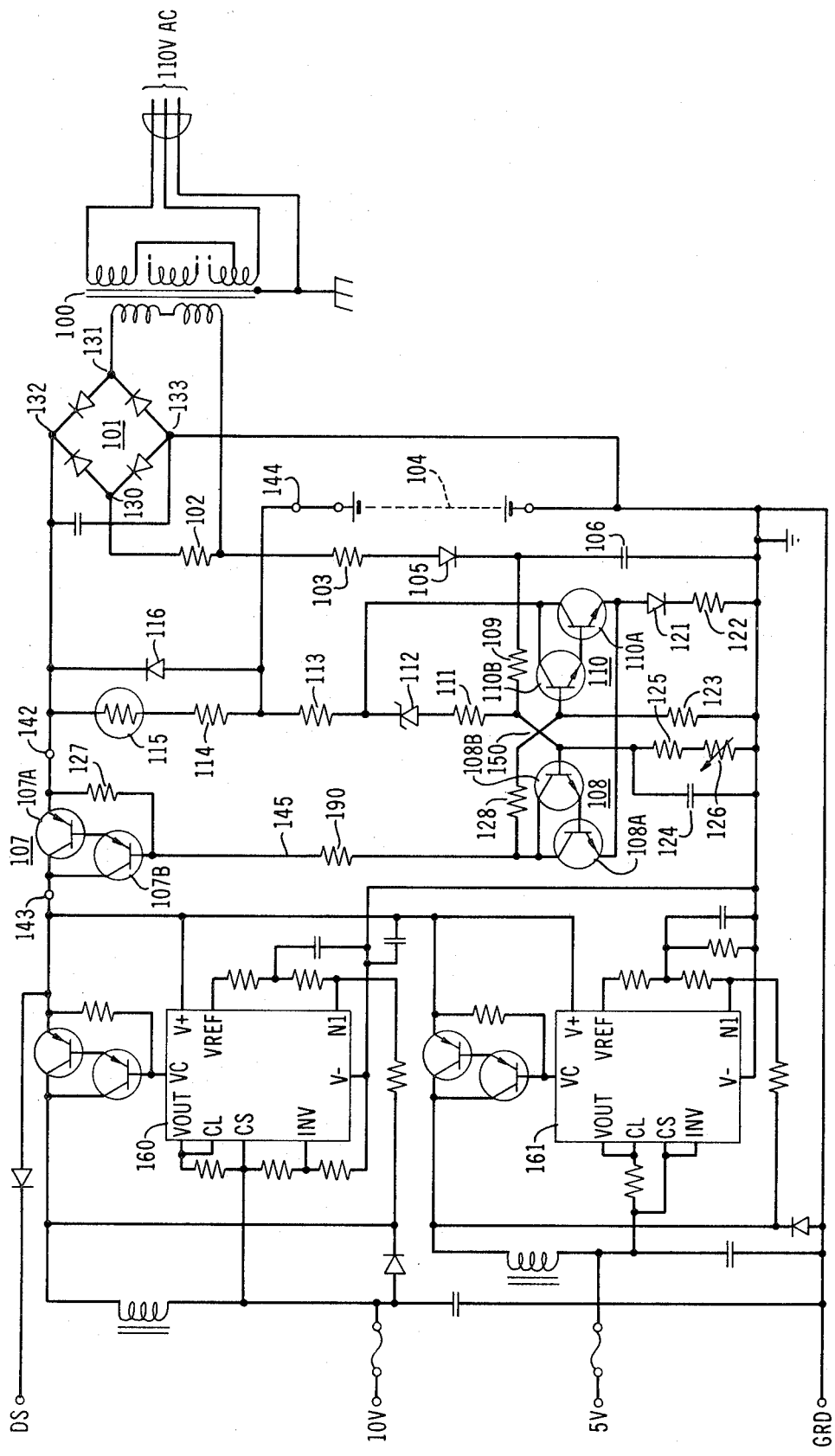

BATTERY PROTECTION CIRCUIT

BACKGROUND OF THE INVENTION

1. Field of the Invention

This invention relates to battery protection circuits.

2. Description of the Prior Art

In AC powered electronic circuit arrangements which must provide service during a failure of the AC power, high capacity, rechargeable batteries are provided as a source of power during such failures. Since nickel-cadmium batteries are rechargeable and have a relatively high volt ampere capacity for their size they are often used in this service. However, care must be taken to limit the current drain on nickel-cadmium batteries after such batteries have reached a particular state of discharge as indicated by their terminal voltage. Failure to limit the current drain on such discharged batteries will cause serious irreversible damage to the cells.

SUMMARY OF THE INVENTION

In accordance with the present invention an unregulated source of power which comprises: a rectifier circuit having input terminals connected to a source of AC power and a standby battery means comprising at least one rechargeable cell is connected to and disconnected from its load circuit by means of a serially connected switch under the control of a control circuit which is set to a first state by the application of AC power to the rectifier circuit and is held in that state so long as such AC power is present, or in the absence of such AC power is held in that state so long as the terminal voltage of the battery means exceeds a predetermined minimum value.

Advantageously, the switch which connects the output of the rectifier and the load, e.g., a regulated power supply, is held in the conducting state for a wide range of battery voltages and is nonconducting when the battery terminal voltage falls below a well defined specific output voltage; and the switch is not re-energized until the source of AC power becomes available even though the battery voltage may rise under conditions of reduced load.

BRIEF DESCRIPTION OF THE DRAWING

The FIGURE is a circuit diagram of a power supply circuit arrangement including a battery protection circuit.

DETAILED DESCRIPTION

In the FIGURE there is shown a bridge rectifier circuit 101 which has terminals 130 and 131 connectable to a source of AC power by the transformer 100. The output of the bridge rectifier circuit 101 is taken across terminals 132 and 133 which are the unregulated supply voltage and ground terminals, respectively. The standby batteries in the illustrative embodiment comprise 20, 1.25-volt, 4-ampere-hour nickel-cadmium cells 104. These cells are connected between ground and output terminal 142.

In the illustrative embodiment the load for the source of power which is available at terminal 142 is connected to that source by means of the semiconductor switch 107 and terminal 143. The switch 107 is held in the ON or conducting state when the transistors 108 are in the ON state and the transistors 110 are in the OFF state. Conversely, the switch 107 is in the OFF or nonconducting state when the transistors 108 are in the OFF state and the transistors 110 are in the ON state.

The transistors 108 and 110 are cross coupled to form a flip-flop circuit. The transistors 108 comprise a pair of transistors 108A and 108B in a Darlington connection to provide high gain. The transistors 110A and 110B are similarly so connected and the flip-flop in that respect is symmetrical. The emitter terminals of the transistors 108A and 110A are connected together and connected to ground through an FET constant current device and the resistor 122 to ground. This circuit arrangement provides a relatively constant base current for the transistors 107A, 107B and keeps the on currents in the collectors of the transistors 108 and 110 approximately equal. This serves to improve performance during switching of states of the control circuit. The collector potential for the transistors 108A, 108B is supplied from the terminal 142 through the resistors 127 and 190. The collector potential for the transistors 110A, 110B is provided from the battery output terminal 144 through the resistor 113. The collector terminals of the transistors 110A, 110B are connected to the base of the transistor 108B by the zener diode 112 and the resistor 111. In this specific illustrative embodiment wherein 20, 1.25-volt batteries are employed, the diode 112 has a reverse threshold value of 16 volts. The collector terminals of the transistors 108A, 108B are cross coupled to the base terminal of the transistor 110B through the resistor 128. The adjustable resistor 126, which is in series with the resistor 125, serves to establish the selected battery terminal voltage at which the load will be disconnected from the battery.

During normal operation, AC power will be applied through the transformer 100 to the terminals 130 and 131 of the bridge rectifier 101. The control circuit 150 is controlled by a signal applied to the base terminal of the transistor 108B. There are two input signals to this point, namely, a rectified AC signal supplied through resistor 109, and a DC signal supplied from the battery terminal 144 through resistor 113, zener diode 112, and resistor 111. The circuit 150 remains in the state in which the transistors 110A and 110B are conducting and the transistors 108A and 108B are held off until such time as the signal from the AC source of power through the resistor 109 is applied. That is, if the circuit is connected as shown without applying a source of AC power to the transformer 100, the control circuit 150 will remain in the above described state and the switch 107 will be in the nonconducting state.

At such time as AC power is applied to the primary of the transformer 100 and thus to the terminals 130 and 131 of the bridge rectifier, a resulting DC potential will be developed at the junction of the diode 105 and capacitor 106. This DC potential results from half-wave rectification of the AC signal by means of the diode 105. The DC path for the rectifier comprises the resistor 109, the resistor 125, the resistor 126, ground, and the diode connected between the terminals 133 and 131 of the bridge rectifier 101. The capacitor 106 serves to filter the rectified voltage. The DC potential developed by half-wave rectification of the AC input power when applied through the resistive voltage divider network comprising the resistors 109, 125, and 126 serves to forward-bias the base to emitter junctions of the transistors 108A, 108B and thus place these Darlington connected transistors in the ON state.

When the transistors 108A, 108B are in the conducting state the transistors 107A, 107B of the switch 107 will conduct since the potential available at terminal 142 forward-biases the emitter to base junctions of these transistors.

When the control circuit 150 is in the above-described state wherein the transistors 108A, 108B are conducting the signal on conductor 145 is termed an "ON" control signal.

The control circuit 150 will continue to generate an "ON" control signal so long as AC power is supplied to the primary of the transformer 100 and the resulting rectified signal of that power is applied through the resistor 109. Additionally, once the circuit 150 has been placed in the condition to generate the "ON" control signal it will continue to generate that signal in the absence of applied AC power if the terminal voltage of the battery 104 is maintained above a predetermined critical value.

For purposes of protecting the nickel-cadmium batteries in the illustrative circuit arrangement, it is assumed that the individual cells which make up the battery means will not deteriorate such that one or more cells will become dangerously discharged prior to the time that the total battery terminal voltage falls to the predetermined minimum value. Accordingly, only the total terminal voltage is utilized in the controlling of the maintenance and removal of the connection between the battery and the load circuit.

During the time the source of AC power is applied to the transformer 100, the resulting DC power available at terminals 132 and 133 of the bridge rectifier 101 is connected to the load input terminal 143 through the output terminal 142 and the series connected switch 107, and is connected to charge the batteries through a ballast lamp 115 and a resistor 114. The ballast lamp 115 and the resistor 114 are provided to limit the charging current supplied to the battery 104.

If the source of AC power is removed from the transformer 100, the output of the rectifier circuit 101 will fall to zero and the battery means 104 will be required to pick up the load which is connected to the terminal 142 through the switch 107. So long as the source of AC power is supplied to the transformer 100 the diode 116 will be back-biased since the rectifier output voltage is higher than the battery terminal voltage. However, when the battery 104 is employed as the source of power for the load, that power is supplied through the diode 116 which becomes forward-biased. Since the forward resistance of the diode 116 is small compared to the combined series resistance of the ballast lamp 115 and the resistor 114, little or no current will flow through that latter combination of elements. Accordingly, approximately the full battery terminal voltage is supplied to the output terminal 142.

The voltage appears at the terminal 144 of the battery means 104 and is, as previously described, applied to the base of the transistor 108B by a path which includes the resistor 113, zener diode 112, and resistor 111. This series connection along with the fixed resistor 125 and the variable resistor 126 is a voltage divider which establishes the base potential of the transistor 108B. The zener diode 112 is a convenient means of reducing the battery voltage which is applied to the base of the transistor 108B without introducing the variations which occur in a purely resistance voltage dividing network.

The network 126 is adjusted so that the control circuit shifts from the first state wherein the transistors 108A and 108B are conducting to a second state wherein the transistors 110A and 110B are conducting whenever the terminal voltage at terminal 144 falls below the predetermined minimum value. For example, in the illustrative case wherein 20, 1.25-volt batteries are employed in series, a minimum terminal voltage of 21 volts may be selected.

When the control circuit 150 has shifted from the first state to the second state the switch 107 will become nonconducting and the load remaining on the battery means 104 will be limited to the current which is supplied to maintain the transistors 110A and 110B in the conducting state. This current drain is sufficiently small that damage to the batteries is not imminent.

The load connected to the output terminal 143 and ground is but representative of the type of load a protected circuit such as that shown in the FIGURE is intended to serve. The load comprises a 10-volt regulated power supply 160 and a 5-volt regulated power supply 161. These load power supplies are arranged to provide substantially constant output voltages even in the presence of relatively large variations in the voltage applied to the input terminal 143. In the illustrative example, this terminal voltage for 20 cells may be at approximately 32 volts so long as AC power is supplied and may fall, for example, to 21 volts before the control circuit reacts to the reduced battery terminal voltage and disconnects the load from the battery means.

Once the control circuit 150 has reacted to a reduced battery potential, that circuit will not change state until such time as AC power is again applied even though the battery terminal voltage may arise under the reduced load conditions.

What is claimed is:

1. A battery protection circuit for an unregulated source of power which comprises: power source first and second output terminals for connection to a load circuit, a primary source of power comprising: a rectifier circuit having input terminals connectable to a source of alternating current power and first and second rectifier output terminals, standby battery means comprising first and second battery terminals, and switching means responsive to ON control signals at a control terminal thereof for selectively connecting said first rectifier output terminal and said first battery terminal to said power source first terminal; and said protection circuit comprises bistable circuit means comprising an output terminal connected to said switching means control terminal, a control terminal, and a power terminal, said power terminal, said second battery terminal, and said rectifier second output terminal connected electrically; resistive means coupling said first output terminal of said rectifier to said control terminal and means including a portion of said last-named means coupling said first terminal of said battery to said control terminal, said control terminal also connected to the input terminal of said rectifier, and asymmetrical circuit means connected between said first terminal of said battery means and said first terminal of said rectifier and connected so that current flows from said battery means if the potential at said first terminal of said rectifier means falls below the potential of said battery means; and said bistable circuit means is proportioned so as to be in a first state and generate at the output terminal thereof an ON control signal in response to a potential in excess of the potential of said battery and to retain that state in response to a potential equal to or greater than a potential which represents a safe discharge potential for said battery and to be in the second state in response to a potential below said safe discharge potential at the control terminal thereof said bistable circuit means remaining in said second state until an AC signal is again applied at the rectifier input terminal.

2. In combination: a primary source of direct current of at least a first potential value connectable to an alternating current source and comprising first and second primary source output terminals; standby battery means comprising first and second battery terminals; a power source output terminal for connection to a load circuit; switching means responsive to ON control signals applied thereto for selectively connecting said first output terminal of said primary source and said first battery terminal to said power source output terminal; bistable circuit means comprising an output terminal connected to a control terminal of said switching means, a control terminal and a power terminal; said power terminal, said second battery terminal, and said second output terminal of said primary source connected electrically; resistive means coupling said first output terminal of said primary source to said control terminal; means including a portion of said resistive means coupling said first battery terminal to said control terminal; said control terminal also connected to the input terminal of said rectifier, and asymmetrical circuit means connected between said first battery terminal and said first terminal of said primary source and poled so that current flows from said battery means through said asymmetrical circuit means if the potential at said first terminal of said primary source falls below the potential of said battery means said bistable means keeping said switching means in an off condition upon a drop in battery potential and turning said switching means on thereafter only upon receiving a signal from the AC source.

* * * * *